United States Patent
Jefford et al.

(10) Patent No.: US 9,726,119 B2
(45) Date of Patent: Aug. 8, 2017

(54) DIRECT MOUNT CANISTER PURGE SOLENOID WITH ADDITIONAL VACUUM PORTS

(71) Applicant: Continental Automotive Systems, Inc., Auburn Hills, MI (US)

(72) Inventors: Robert Douglas Jefford, Chatham (CA); Benjamin Dominick Manton Williams, Chatham (CA); David William Balsdon, Chatham (CA); David Rene Forgeron, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 94 days.

(21) Appl. No.: 14/282,604

(22) Filed: May 20, 2014

(65) Prior Publication Data
US 2014/0345707 A1    Nov. 27, 2014

Related U.S. Application Data

(60) Provisional application No. 61/825,649, filed on May 21, 2013, provisional application No. 61/825,681, filed on May 21, 2013, provisional application No. 61/825,616, filed on May 21, 2013.

(51) Int. Cl.
| | | |
|---|---|---|
| *F02M 25/08* | (2006.01) |
| *F16K 27/00* | (2006.01) |
| *F16K 15/14* | (2006.01) |
| *F16K 31/06* | (2006.01) |
| *B60K 15/035* | (2006.01) |

(52) U.S. Cl.
CPC .... *F02M 25/0836* (2013.01); *F02M 25/0818* (2013.01); *F16K 15/148* (2013.01); *F16K 27/00* (2013.01); *F16K 31/0658* (2013.01); *B60K 15/03504* (2013.01); *Y10T 137/5109* (2015.04); *Y10T 137/6851* (2015.04); *Y10T 137/86485* (2015.04)

(58) Field of Classification Search
CPC .................... F02M 25/0836; F02M 25/0818
USPC ................ 123/518, 520; 137/118.01, 118.02
See application file for complete search history.

(56) References Cited

U.S. PATENT DOCUMENTS

| | | | | |
|---|---|---|---|---|
| 4,308,841 | A * | 1/1982 | Kingsley | ............ F02M 25/0776 123/520 |
| 4,830,332 | A * | 5/1989 | Miura | .................. F16K 31/0655 251/129.07 |
| 5,809,977 | A * | 9/1998 | Krimmer | ............ F02M 25/0836 123/516 |
| 2002/0096153 | A1 * | 7/2002 | Balsdon | ............. F02M 25/0809 123/520 |

(Continued)

*Primary Examiner* — Craig Schneider
*Assistant Examiner* — Angelisa L Hicks

(57) ABSTRACT

A valve assembly, such as a canister purge solenoid (CPS) having one or more interchangeable components which may be used to reconfigure the valve assembly to have one or more additional vacuum ports. The design of the valve assembly eliminates the need to mold these ports into the intake manifold, simplifying the design of the manifold, and the tooling needed to make the manifold. The direct mount design of the CPS of the present invention includes at least one additional port to serve as an additional vacuum port to be used for any other purpose, such as a PCV valve, brake booster, or the like.

10 Claims, 4 Drawing Sheets

(56) References Cited

U.S. PATENT DOCUMENTS

2004/0025851 A1\* 2/2004 Krimmer ........... F02M 25/0836
　　　　　　　　　　　　　　　　　　　　　　　　　123/522
2012/0318243 A1\* 12/2012 Williams ........... F02M 25/0836
　　　　　　　　　　　　　　　　　　　　　　　　　123/520

\* cited by examiner

DIRECT MOUNT CANISTER PURGE SOLENOID WITH ADDITIONAL VACUUM PORTS

CROSS-REFERENCE TO RELATED APPLICATIONS

This application claims the benefit of U.S. Provisional Application No. 61/825,649 filed May 21, 2013, U.S. Provisional Application No. 61/825,681 filed May 21, 2013, and U.S. Provisional Application No. 61/825,616 filed May 21, 2013. The disclosures of the above applications are incorporated herein by reference.

FIELD OF THE INVENTION

The invention relates generally to a valve assembly mounted to an intake manifold which provides for additional vacuum sources to accommodate different vacuum needs for an airflow system of an engine.

BACKGROUND OF THE INVENTION

Engine vacuum is used to drive multiple devices on modern engines (such as the positive crankcase ventilation (PCV) valve, brake boosters, etc.), and additional ports may be needed to provide the necessary vacuum to operate these devices. These ports may be added to a component such as the intake manifold, or the like. Current designs commonly incorporate vacuum ports into the intake manifold or throttle body. However, this requires different tooling and equipment to manufacture the different intake manifolds having numerous possible vacuum port configurations.

Incorporating multiple types of tooling and equipment in the manufacturing process is both costly and inefficient. Accordingly, there exists a need for a configuration which accommodates different uses for the vacuum generated by an intake manifold.

SUMMARY OF THE INVENTION

The present invention is a valve assembly having one or more interchangeable components which may be used to reconfigure the valve assembly to have one or more additional vacuum ports. The design of the present invention eliminates the need to mold these ports into the intake manifold, simplifying the design of the manifold, and the tooling needed to make the manifold.

In one embodiment, the valve assembly is a canister purge solenoid (CPS). The direct mount design of the CPS of the present invention includes at least one additional port to serve as an additional vacuum port to be used for any other purpose, such as a PCV valve, brake booster, or the like.

One of the advantages of the design of the present invention is reduced cost, less tool complexity, and a reduced amount of connections. The additional vacuum port(s) is easier to incorporate into the valve assembly, than an intake manifold or air box.

In alternate embodiment, two or more vacuum ports could be incorporated into the design, allowing the vacuum generated by the intake manifold or air box to be used for more than one application.

In one embodiment, the present invention is a valve assembly in the form of a canister purge solenoid having a plurality of attachments, where the valve assembly includes a housing, such as a reservoir, at least one cavity formed as part of the reservoir, a first flange portion integrally formed as part of the reservoir, and a second flange portion integrally formed as part of the reservoir. A first vent port is attached to the first flange portion and is in fluid communication with an intake manifold and the at least one cavity. One of a plurality of attachments is selectively connected to the second flange portion formed as part of the reservoir, such that the connection of a first of the plurality of attachments to the second flange portion places the valve assembly in a first configuration, and the connection of a second of the plurality of attachments to the second flange portion places the valve assembly in a second configuration.

Vacuum pressure from the intake manifold is used to actuate a device connected to the first of the plurality of attachments when the first of the plurality of attachments is connected to the second flange portion, and air flow is prevented from entering or exiting the reservoir when the second of the plurality of attachments is connected to the second flange portion.

The first vent port also includes a first cap portion, a first base portion integrally formed with the first cap portion, and a first outer flange portion integrally formed with the first base portion. The first outer flange portion is connected to the first flange portion when the first vent port is attached to the reservoir.

One of the plurality of attachments may be a second vent port in fluid communication with the cavity, where the second vent port is connected to the second flange portion. The second vent port includes a second cap portion, a second base portion integrally formed with the second cap portion, and a second outer flange portion integrally formed with the second base portion. The second outer flange portion is connected to the second flange portion when the second vent port is attached to the reservoir.

One of the plurality of attachments may also be a cap member. The cap member may also include an outer flange portion and a wall member integrally formed with the outer flange portion. The outer flange portion of the cap member is connected to the second flange portion formed as part of the reservoir. The wall member is solid, and prevents air from entering and exiting the reservoir.

The device which uses vacuum pressure for actuation may be one of several components. Examples include, but are not limited to, a positive crankcase ventilation valve, a brake booster, and an air injection unit, or any other component suitable for connection with the canister purge solenoid, and requires vacuum for actuation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
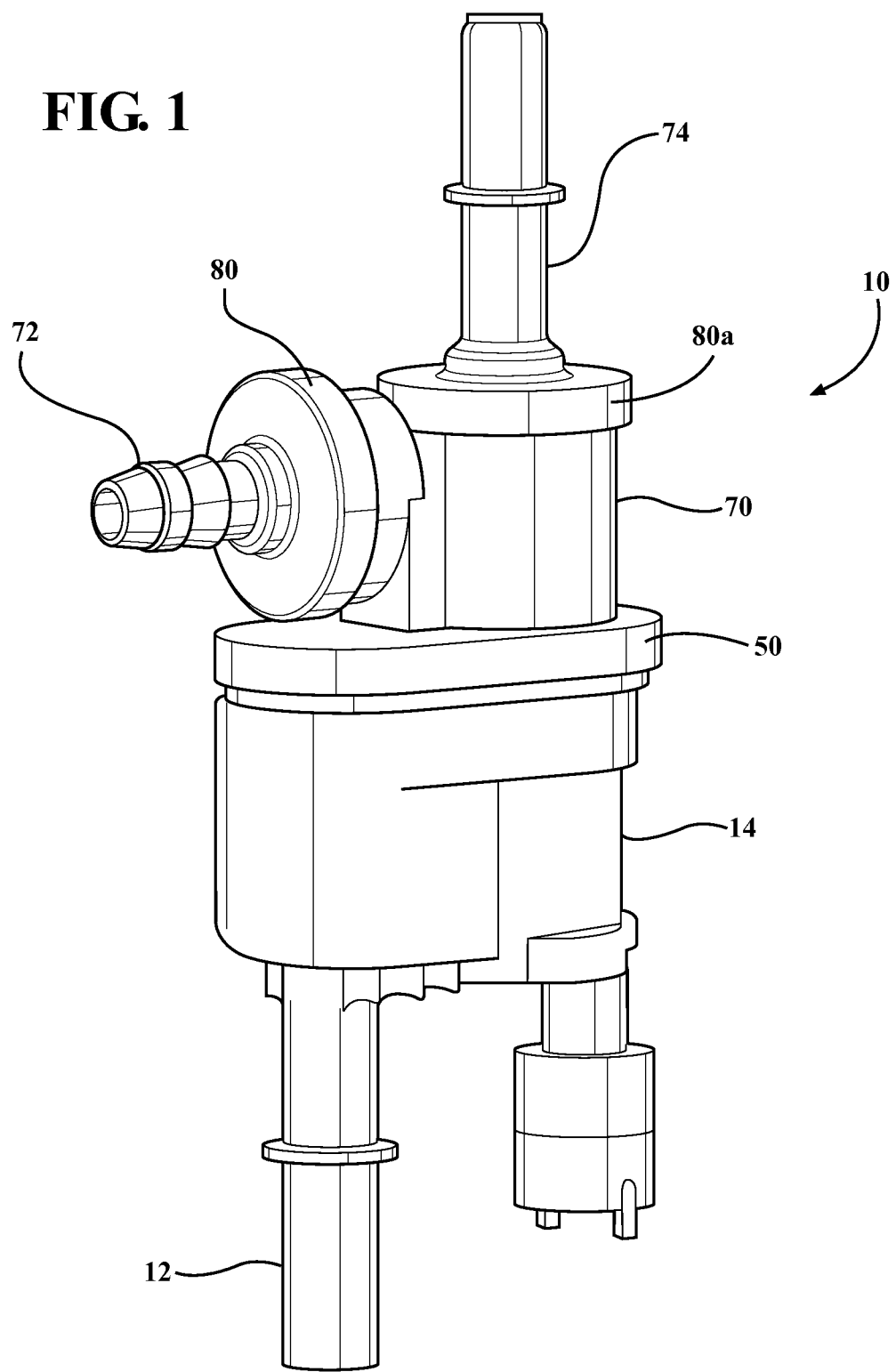
FIG. 1 is a perspective view of a canister purge valve having one or more of a plurality of attachments in a first configuration, according to embodiments of the present invention.

The following description of the preferred embodiment(s) is merely exemplary in nature and is in no way intended to limit the invention, its application, or uses.

A canister purge solenoid (CPS) according to the present invention is shown in the Figures generally at 10. The CPS 10 has multiple configurations and is suitable for connection with different attachments to provide one or more ports, allowing for the vacuum from an intake manifold to be used to actuate different components, depending on the applications desired. The CPS 10 includes an inlet port 12 in fluid communication with a carbon canister.

Referring to FIGS. 1-4, the CPS 10 includes an overmold assembly 14, and disposed within the overmold assembly 14 is a solenoid assembly, shown generally at 16, and the solenoid assembly 16 is disposed within a cavity, shown generally at 18, formed as part of the overmold assembly 14, and the cavity 18 includes an inner wall portion 20, and also forming part of the cavity 18 is an outer wall portion 22 of the overmold assembly 14.

The solenoid assembly 16 includes a stator insert 24 which surrounds a support 26 formed as part of the overmold assembly 14. A first washer 28 is disposed between an upper wall 30 of the overmold assembly 14 and a bobbin 32. The bobbin 32 is surrounded by a coil 34, and two straps (not shown) surround the coil 34. There is a sleeve 36 which is surrounded by the bobbin 32, and the sleeve 36 partially surrounds a moveable armature 38. The armature 38 includes a cavity, shown generally at 40, and located in the cavity 40 is a spring 42, which is in contact with an inner surface 48 of the cavity 40. The spring 42 is also mounted on a narrow diameter portion 44 of the support 26. Disposed between part of the armature 38 and the bobbin 32 is a second washer 46. Connected to the overmold assembly 14 is a cap 50, and formed as part of the cap 50 is a valve seat 52 and a cap aperture 54, where purge vapor is able to flow from an overmold assembly cavity, shown generally at 56, formed as part of the overmold assembly 14 and through the cap aperture 54.

Figure 3:
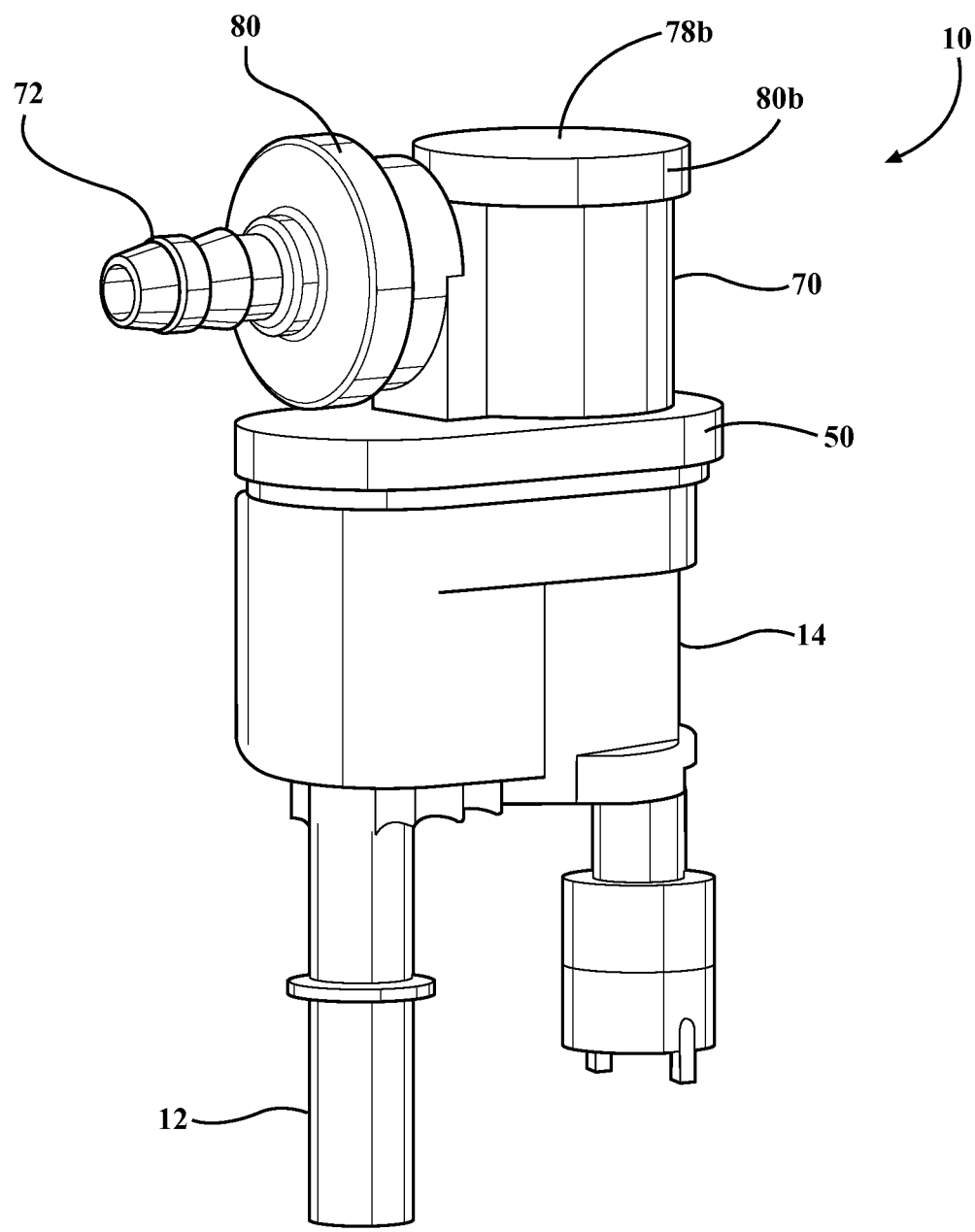
FIG. 3 is a perspective view of a canister purge valve having one or more of a plurality of attachments in a second configuration, according to embodiments of the present invention.

The armature 38 includes a stopper portion 58 which is made of a rubber or other flexible material. The stopper portion 58 includes a contact surface 60 which contacts the valve seat 52 when the armature 38 is in the closed position. The stopper portion 58 includes a plurality of post members 62, which are of the same durometer, but are of different sizes, and therefore have different levels of stiffness. The largest post members 62 are in contact with the bottom surface of the washer 46 when the armature 38 is in the closed position, as shown in FIG. 3. The smaller post members 62 contact the bottom surface of the washer 46 when the armature 38 moves to the open position. The coil 34 is energized to move the armature 38 away from the valve seat 52, placing the solenoid assembly 16 in an open position. The more the coil 34 is energized, the further the armature 38 moves away from the valve seat 52, and the greater number of post members 62 contact the bottom surface of the washer 46. The movement of the armature 38 to open and close the solenoid assembly 16 controls the amount of purge vapor allowed to pass through the CPS 10, and into the intake manifold.

Because the post members 62 are made of rubber, the post members 62 are able to deform as the armature 38 is moved further away from the valve seat 52. The largest post members 62 in contact with the bottom surface of the washer 46 deform first when the armature 38 moves away from the valve seat 52. As the armature 38 moves further away from the valve seat 52, more of the post members 62 contact the bottom surface of the washer 46, and then begin to deform as the armature 38 moves even further away from the valve seat 52. The deformation of the post members 62 (when the armature 38 is moved to the open position away from the valve seat 52) functions to dampen the movement of the armature 38, eliminating noise, and preventing metal-to-metal contact between the armature 38 and the stator insert 24.

Disposed between the bottom surface of the washer 46 and an inside surface 64 of the cap 50 is a filter 66. The filter 66 is made of several blades of plastic which are adjacent to one another. The filter 66 is designed to limit the size of debris and particles passing through the blades of plastic to less than 0.7 millimeters. The distance between the armature 38 and the stator insert 24 is about 1.0 millimeters, and is the maximum allowable distance between the contact surface 60 of the stopper portion 58 and the valve seat 52. The filter 66 ensures that no particles may pass through the filter 66 that are too large to affect the functionality of the solenoid assembly 16 (the particles being too large to fit between the valve seat 52 and the stopper portion 58) when the armature 38 is in the open position.

The aperture 54 is also in fluid communication with a reservoir cavity, shown generally at 68, formed as part of housing, which in this embodiment is a reservoir 70. As mentioned above, the more the coil 34 is energized, the further the armature 38 moves away from the valve seat 52, placing the solenoid assembly 16 in an open position, allowing air and purge vapor to pass from the overmold assembly cavity 56, through the cap aperture 54 and into the reservoir cavity 68. The reservoir 70 essentially functions as a modular housing, having multiple configurations, making the CPS 10 suitable for multiple applications, and therefore suitable for use in different types of vehicles having additional components requiring vacuum actuation.

Figure 2:
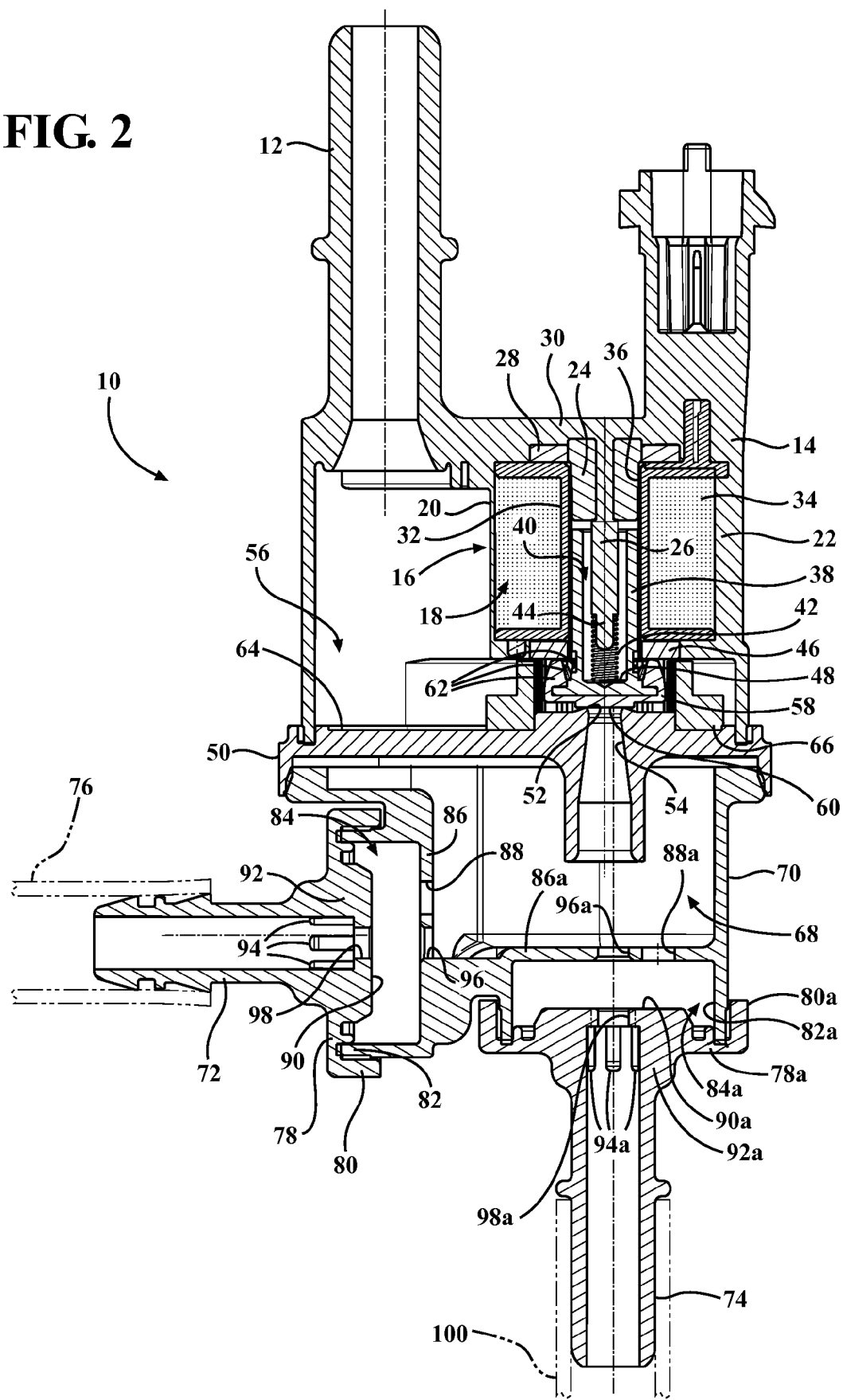
FIG. 2 is a sectional side view of a canister purge valve having one or more of a plurality of attachments in a first configuration, according to embodiments of the present invention.

In one configuration shown in FIGS. 1-2, there are two attachments connected to the reservoir 70, the first attachment is a first vent port 72, and the second attachment is a second vent port 74. Each of the attachments are connected to the reservoir 70 using one of a plurality of connection structures. The cavity 68 is in fluid communication with both of the first vent port 72, and the second vent port 74, which are substantially similar in construction.

The first vent port 72 is connected to a first hose or conduit 76, and the first hose 76 provides fluid communication between the first vent port 72 and the intake manifold, placing the CPS 10 in fluid communication with the intake manifold. The first vent port 72 includes a first cap portion 78, and the first cap portion 78 includes a first outer flange portion 80 which is connected to a first connection structure, which in this embodiment is a first flange portion 82 formed as part of the reservoir 70. The connection between the outer flange portion 80 and the flange portion 82 may be any suitable connection, such as snap-fitting, welding, an adhesive, or the like. The connection between the cap portion 78 and the flange portion 82 forms a first port cavity, shown generally at 84, and formed as part of a first side wall 86 of the reservoir 70 is a first port aperture 88, which allows for fluid communication between the cavity 84 and the cavity 68.

The first vent port 72 also includes a first inner wall 90 integrally formed with the cap portion 78. The inner wall 90 is part of a first base portion 92, and formed as part of the base portion 92 is a first plurality of vents 94 which are in fluid communication with the cavity 84, such that purge vapor is able to flow from the cavity 68 through the aperture 88 into the cavity 84, and through the vents 94 and into the first vent port 72.

There is also an aperture 96 formed as part of the side wall 86, and aperture 98 formed as part of the base portion 92. The apertures 96,98 allow additional purge vapor to flow from the reservoir cavity 68, through the first port cavity 84, and through the vents 94. However, the first vent port 72 is constructed such that a check valve is able to be placed in the cavity 84, allowing the CPS 10 to be adaptable for applications requiring a check valve. In one of these applications, the check valve may include a guide member which extends into the apertures 96,98, to guide the movement of the check valve.

As mentioned above, the configuration of the CPS 10 is adaptable for different applications, and for use with additional components requiring vacuum to function. The configuration of the CPS 10 shown in FIGS. 1-2 includes the second attachment, which in this embodiment is the second vent port 74, which has similar components to the first vent port 72, and functions in a similar manner. The second vent port 74 includes a second cap portion 78a having a second outer flange portion 80a connected to a second connection structure, which in this embodiment is a second flange portion 82a of the reservoir 70, and a second port cavity, shown generally at 84a, formed by the connection of the cap portion 78a to the second flange portion 82a. A second side wall 86a is also formed as part of the reservoir 70, and a second port aperture 88a is formed as part of the second side wall 86a to provide fluid communication between the cavity 68 and the second port cavity 84a. There is also an inner wall 90a formed as part of the base portion 92a. The base portion 92a and the second cap portion 78a are part of the second vent port 74. Similarly to the first base portion 92, there is a second plurality of vents 94a formed as part of the base portion 92a. There is also an aperture 96a formed as part of the second side wall 86a and, and aperture 98a formed as part of the second base portion 92a.

A second conduit, or second hose 100 may be connected to the second vent port 74, and the second hose may be connected to another device requiring vacuum pressure for actuation, such as a PCV, a brake booster, or the like. The vacuum pressure from the intake manifold draws air from the reservoir cavity 68 into the first hose 76, and therefore into the intake manifold. When the solenoid assembly 16 is in an open position, the purge vapor is allowed to pass from the overmold assembly cavity 56, through the cap aperture 54, the reservoir cavity 68, and into the first conduit 76. Additionally, the second vent port 74 is also exposed to this vacuum pressure, and therefore the second conduit 100 is also exposed to this vacuum pressure as well. This allows for the component connected to the second conduit 100 to be actuated using the vacuum pressure from the intake manifold. Therefore, the component connected to the second conduit 100 may be actuated using vacuum pressure from the intake manifold, regardless of whether the solenoid assembly 16 is in an open or closed position.

Figure 4:
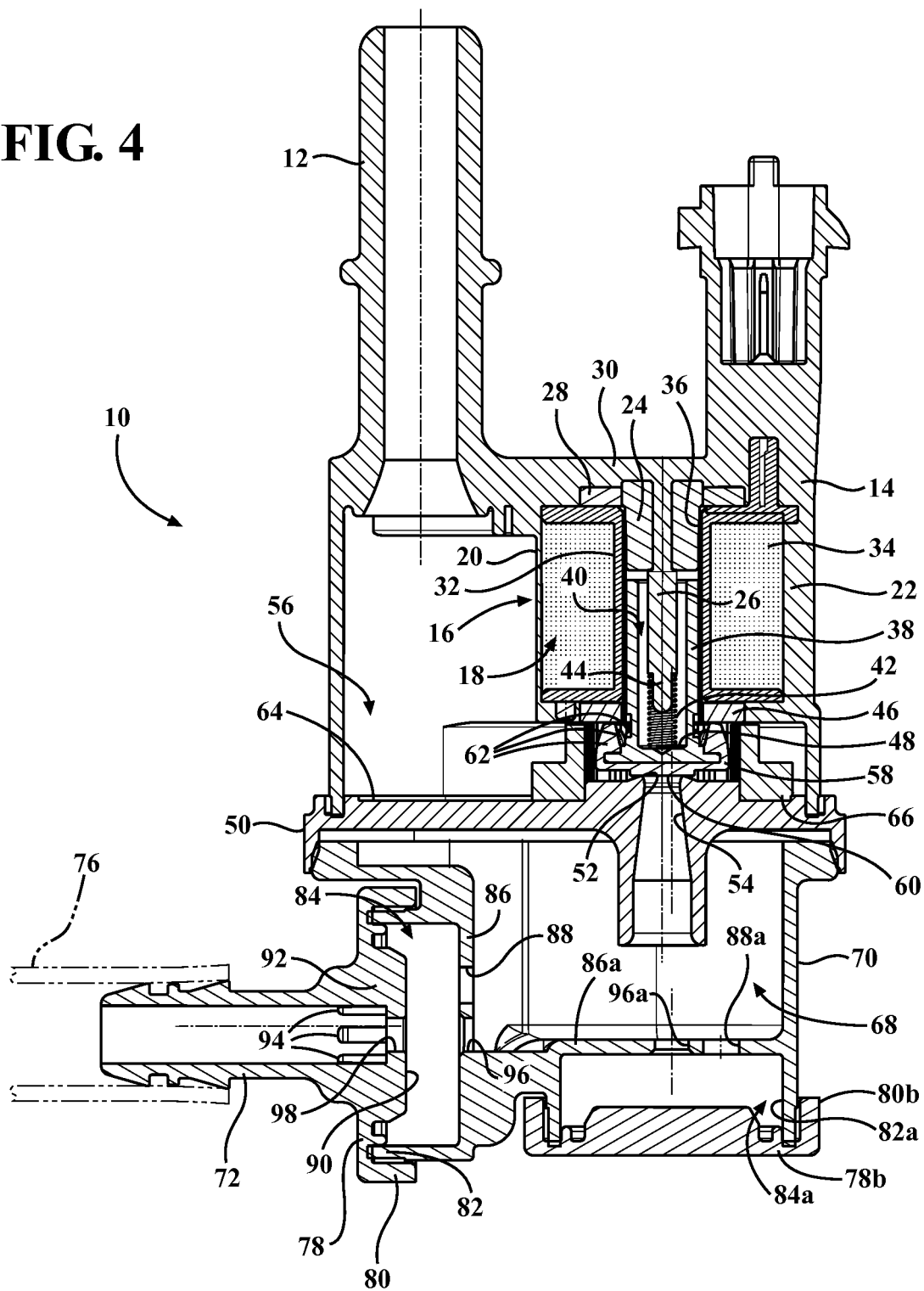
FIG. 4 is a sectional side view of a canister purge valve having one or more of a plurality of attachments in a second configuration, according to embodiments of the present invention.

Another configuration of the CPS 10 is shown in FIGS. 3-4. In this configuration, the second vent port 74 is not used. Instead, another type of attachment, which in this embodiment is a cap member 78b, is attached to the reservoir 70. More specifically, the cap member 78b includes a second outer flange portion 80b which is attached to the second flange portion 82a of the reservoir 70. The reservoir 70 is of the same construction in FIGS. 1-4, and the second flange portion 82a is connectable with either the second outer flange portion 80b of the cap member 78b, or the second outer flange portion 80a of the second cap portion 78a. The second outer flange portion 80b of the cap member 78b is connected to the second flange portion 82a in the same manner as the second outer flange portion 80a of the second cap portion 78a, through a laser weld, a snap-fit connection, an adhesive, or the like. The connection of either the cap portion 78a or the cap member 78b to the second flange portion 82a of the reservoir 70 allows for the construction of the reservoir 70 to remain the same, while allowing for the CPS 10 to be adaptable for different applications, where an additional vacuum source is necessary. Where an additional vacuum source is not necessary, the BSV assembly 34 may be configured to have the cap member 78b as shown in FIGS. 3-4. Where additional vacuum source is necessary, the BSV assembly 34 may be configured to include the cap portion 78a having the second vent port 74, as shown in FIGS. 1-2.

The present invention is not limited to the configurations described above. It is also within the scope of the invention that the second vent port 74 may be attached to the second flange portion 82a, and the cap member 78b may be attached to the first flange portion 82, if the packaging requirements require such a configuration.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a valve assembly for exclusively controlling the flow of purge vapor between a carbon canister and an intake manifold, including:
        a reservoir in fluid communication with the intake manifold;
        an overmold assembly connected to the reservoir, the overmold assembly in fluid communication with the carbon canister;
        a solenoid assembly disposed in the overmold assembly;
        a valve connected to the solenoid assembly such that the solenoid assembly controls the position of the valve, the valve being located in the overmold assembly;
        an overmold assembly cavity formed as part of the overmold assembly such that the overmold assembly cavity is adjacent the solenoid assembly;
        a reservoir cavity formed as part of the reservoir, and the solenoid assembly controls the position of the valve such that the solenoid assembly controls the flow of purge vapor between the overmold assembly cavity and the reservoir cavity;
        a plurality of connection structures formed as part of the housing, such that each of the plurality of connection structures are integrally formed with the reservoir; and at least one attachment selectively connected to one of the plurality of connection structures, the at least one attachment placing the valve assembly in one of a plurality of configurations;

wherein the valve assembly is able to transfer vacuum pressure from the intake manifold to a device connected to the at least one attachment based on the attachment of the at least one attachment connected to one of the plurality of connection structures.

2. The apparatus of claim 1, the at least one attachment further comprising a first vent port, the first vent port placing the valve assembly in fluid communication with the intake manifold.

3. The apparatus of claim 2, the first vent port further comprising a first outer flange portion connected to a first of the plurality of connection structures.

4. The apparatus of claim 3, the first of the plurality of connection structures further comprising a first flange portion formed as part of the reservoir, wherein the first outer flange portion is connected to the first flange portion when the first vent port is connected to the reservoir.

5. The apparatus of claim 3, the first vent port further comprising:
a first cap portion; and
a first base portion integrally formed with the first cap portion;
wherein the first cap portion is integrally formed with the first outer flange portion.

6. The apparatus of claim 1, the at least one attachment further comprising a second vent port connected to a second of one of the plurality of connection structures, the second vent port providing fluid communication between the valve assembly and the device.

7. The apparatus of claim 6, the second vent port further comprising a second outer flange portion connected to the second of the plurality of connection structures when the second vent port is connected to the reservoir.

8. The apparatus of claim 7, the second of the plurality of connection structures further comprising a second flange portion formed as part of the reservoir, wherein the second outer flange portion of the second vent port is connected to the second flange portion when the second vent port is connected to the reservoir.

9. The apparatus of claim 7, the second vent port further comprising:
a second cap portion; and
a second base portion integrally formed with the second cap portion;
wherein the second cap portion is integrally formed with the second outer flange portion.

10. The apparatus of claim 1, the device further comprising one selected from the group consisting of a positive crankcase ventilation valve, a brake booster, and an air injection unit.

* * * * *